US011360749B2

(12) United States Patent
Chang et al.

(10) Patent No.: US 11,360,749 B2
(45) Date of Patent: Jun. 14, 2022

(54) DEVICE FOR DYNAMICALLY GENERATING NUMERICAL CONTROLLER SOFTWARE OF MACHINE TOOL AND METHOD FOR THE SAME

(71) Applicant: Industrial Technology Research Institute, Hsin-Chu (TW)

(72) Inventors: Wan-Kun Chang, Taichung (TW); Tzuo-Liang Luo, Taichung (TW); Shuo-Peng Liang, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 0 days.

(21) Appl. No.: 17/133,999

(22) Filed: Dec. 24, 2020

(65) Prior Publication Data
US 2022/0129253 A1   Apr. 28, 2022

(30) Foreign Application Priority Data
Oct. 22, 2020   (TW) ................................ 109136681

(51) Int. Cl.
  *G06F 8/36*   (2018.01)
  *G05B 19/408*   (2006.01)
  *G06F 8/10*   (2018.01)
(52) U.S. Cl.
  CPC ............. *G06F 8/36* (2013.01); *G05B 19/408* (2013.01); *G06F 8/10* (2013.01); *G05B 2219/36023* (2013.01)
(58) Field of Classification Search
  CPC ............ G06F 8/36; G06F 8/10; G05B 19/408
  (Continued)

(56) References Cited

U.S. PATENT DOCUMENTS 5,252,899 A * 10/1993 Kawamura ........ G05B 19/4141
  700/169
5,317,501 A * 5/1994 Hilpert ............... G05B 19/4145
  700/3
(Continued)

FOREIGN PATENT DOCUMENTS

CN         103605318 B     2/2017
TW             475911      2/2002
(Continued)

OTHER PUBLICATIONS

Kim et al, "An Iterative Control Leaning Method with Application of CNC Machine Tools", IEEE, pp. 66-72 (Year: 1996).*
(Continued)

*Primary Examiner* — Anil Khatri
(74) *Attorney, Agent, or Firm* — WPAT, PC

(57) ABSTRACT

A device for dynamically generating numerical controller software of machine tool includes a software function-specification managing unit, a function-module storage unit and a function-module composing unit. The software function-specification managing unit is to produce a text description file describing function modules required by the numerical controller software, and then for performing specification analysis upon the text description file to generate a function module table including the function modules. The function-module storage unit is to memorize and manage the function modules, wherein the function-module storage unit confirms whether or not the function-module storage unit has been furnished with the f function modules required by the numerical controller software. The function-module composing unit is to retrieve the required function modules from the function-module storage unit, and further to set the connection among the function modules to com-
(Continued)

pose the numerical controller software. In addition, a method for the device is also provided.

6 Claims, 4 Drawing Sheets

(58) Field of Classification Search
USPC .................................................. 717/107–121
See application file for complete search history.

(56) References Cited

U.S. PATENT DOCUMENTS

| | | | | |
|---|---|---|---|---|
| 6,604,015 | B2 * | 8/2003 | Iriguchi | G05B 19/4097 318/567 |
| 6,728,595 | B2 * | 4/2004 | Hamamura | G05B 19/4163 700/108 |
| 7,013,296 | B1 * | 3/2006 | Yemini | G06Q 30/04 705/52 |
| 7,117,056 | B2 * | 10/2006 | Balic | G05B 19/4099 700/121 |
| 7,145,898 | B1 * | 12/2006 | Elliott | H04L 29/1216 379/900 |
| 7,206,834 | B1 * | 4/2007 | Barth | G05B 19/406 709/224 |
| 8,676,372 | B1 * | 3/2014 | Bolin | G05B 19/4163 700/191 |
| 8,843,885 | B2 * | 9/2014 | Nakai | G06F 8/34 717/110 |
| 10,152,046 | B2 * | 12/2018 | Hsu | G05B 19/40937 |
| 10,272,013 | B2 * | 4/2019 | Chapman | A61H 31/00 |
| 10,324,438 | B2 | 6/2019 | Shimoda | |
| 10,356,214 | B2 * | 7/2019 | Joshi | G06F 9/45558 |
| 2002/0120921 | A1 | 8/2002 | Coburn et al. | |
| 2020/0218234 | A1 | 7/2020 | Abe et al. | |

FOREIGN PATENT DOCUMENTS

| | | |
|---|---|---|
| TW | M382510 | 6/2010 |
| TW | 201025154 A | 7/2010 |
| TW | 201339776 A | 10/2013 |
| TW | I460568 B | 11/2014 |
| TW | I493307 | 7/2015 |
| TW | I627518 | 6/2018 |
| TW | I649662 | 2/2019 |
| TW | I656940 | 4/2019 |

OTHER PUBLICATIONS

Soetens et al., "Real time Hybrid Task-Based Control for Robots and Machine Tools", IEEE, pp. 259-264 (Year: 2005).*
Martinov et al., "Implementation of Control for Peripheral Machine Equipment Based on the External Soft PLC Integrated with CNC", IEEE, pp. 1-4 (Year: 2017).*
Wang et al, "A research on reconfigurable numerical controller based on embedded system", IEEE, pp. 189-193 (Year: 2006).*
Hasan et al., "Design and Implementation of a Microcontroller Based Low Cost Computer Numerical Control (CNC) Plotter using Motor Driver Controller", IEEE, pp. 1-5 (Year: 2019).*
Hu et al, "Adaptive Slave Controller Assignment for Fault-tolerant Control Plane in Software-Defined Networking", IEEE, pp. 1-6 (Year: 2018).*
Rine et al, A Reusable Software Adaptive Fuzzy Controller Architecture:, ACM, pp. 633-638 (Year: 1996).*
TW OA issued on Jun. 7, 2021.

* cited by examiner

```
Users > wayne65 > {} CNC_Module_spec_milling_3axis.json > ...
1  {
2      "hmi": "milling",
3      "op": "milling",
4      "plc": "cnc_normal",
5      "mot": "milling",
6      "kinematics": "milling_3axis",
7      "param":"cnc_full"
8  }
```

FIG. 3A

```
Users > wayne65 > {} CNC_Module_spec_milling_5axis.json > ...
1  {
2      "hmi": "milling",
3      "op": "milling",
4      "plc": "cnc_normal",
5      "mot": "milling",
6      "kinematics": "milling_5axis",
7      "param":"cnc_full"
8  }
```

```
1
2  HMI_MODULE_CNC_MILLING
3  OP_MODULE_CNC_MILLING
4  PLC_MODULE_CNC_NORMAL
5  MOT_MODULE_MILLING
6  KINEMATICS_MODULE_MILLING_3
7  PARAM_MODULE_CNC_FULL
8
```

FIG. 4

DEVICE FOR DYNAMICALLY GENERATING NUMERICAL CONTROLLER SOFTWARE OF MACHINE TOOL AND METHOD FOR THE SAME

CROSS REFERENCE TO RELATED APPLICATION

This application claims the benefits of Taiwan application Serial No. 109136681, filed Oct. 22, 2020, the disclosures of which are incorporated by references herein in its entirety.

TECHNICAL FIELD

The present disclosure relates in general to a machine tool technology, and more particularly to a device for dynamically generating numerical controller software of machine tool and a method for the same.

BACKGROUND

Due to global economic changes, a demand for rapid relocation and reconstruction of production plants has been dramatically increased. In particular, after relocating CNC machines, controller parameters or variables need to be reset. In addition, machining programs and processing parameters need to be reorganized as well. Definitely, any of the aforesaid changes would cost lots of labor and time.

In a conventional controller software, existing shortcomings include at least unchangeable controller software, needs of internal parameters or variables for adjusting some few functions, requiring more memory for storing software, and independent storage requirement for some control software, from which the numerical controller software of machine tool can only fit specific hardware, and thus flexible arrangement between hardware and software would be unfeasible. Hence, as long as the controller is set to serve a specific type of machine tool such as a milling machine or a lathe, the controller would be dead for the other machine tool.

For example, if a three-axis controller is used for a numerical controller of machine tool, and if an upgrade need for a five-axis controller is met, then a repurchase for a complete set of new five-axis controllers is necessary. Such a move implies a huge expense and may thereby lead to a hike in production cost.

In addition, even that the numerical controller software of machine tool is clouded, it is inevitable to apply a virtual machine to simulate the complete software. That is, for a three-axis milling controller, a complete set of software is needed; for a five-axis controller, another complete set of software is needed; and, for two-axis lathe controller, another different complete set of software is needed. As such, plenty memory space at the cloud end is necessary.

Nevertheless, an executable file of the numerical controller software of machine tool is usually written in two ways; one of which is to compile the controller source code into a function library and then link it into a single executable file, and the other one of which is to compile the library of function modules into a single executable file applicable to various operation systems. No matter which way is applied, the mode of compiling the function library is common thereto. If hardware of machine tool is changed, re-compiling a new executable file is necessary.

Accordingly, an improved device for dynamically generating numerical controller software of machine tool and a corresponding method for the same is definitely important and urgent to the skill in the art for generating rapidly required numerical controller software to various numerical controllers of machine tool.

SUMMARY

In one embodiment of this disclosure, a device for dynamically generating numerical controller software of machine tool includes a software function-specification managing unit, a function-module storage unit and a function-module composing unit. The software function-specification managing unit is used for producing a text description file that describes a plurality of function modules required by numerical controller software of machine tool, and then for performing specification analysis upon the text description file to generate a function module table including the plurality of function modules. The function-module storage unit is used for memorizing and managing the plurality of function modules with different functions, wherein the function-module storage unit is used to confirm whether or not the function-module storage unit has been furnished with the plurality of function modules required by the numerical controller software of machine tool. The function-module composing unit is used for retrieving the plurality of function modules from the function-module storage unit, and further for setting the connection among the plurality of function modules to compose the numerical controller software of machine tool.

In another embodiment of this disclosure, a method for dynamically generating numerical controller software of machine tool includes the following steps: having a software function-specification managing unit to produce a text description file for describing a plurality of function modules required by a numerical controller software of machine tool, and then performing specification analysis upon the text description file so as to generate a function module table including the plurality of function modules; having a function-module storage unit to confirm whether or not the function-module storage unit has been furnished with the plurality of function modules required by the numerical controller software of machine tool, going to the next step if positive, generating an error message and ending the method if negative; having a function-module composing unit to retrieve the plurality of function modules from the function-module storage unit, setting the connection among the plurality of function modules, and generating the numerical controller software of machine tool to be confirmed; and, having the function-module composing unit to confirm whether or not the numerical controller software of machine tool has been successfully composed, generating a success message to confirm that the numerical controller software of machine tool is an executable numerical controller software of machine tool if positive, generating another error message and ending the method if negative.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 3A and FIG. 3B show schematically embodiments of the text description files for describing function modules required by different numerical controller software of machine tool in accordance with this disclosure;

FIG. 4 is a schematic view of an embodiment of the function module table in accordance with this disclosure.

DETAILED DESCRIPTION

Figure 1:
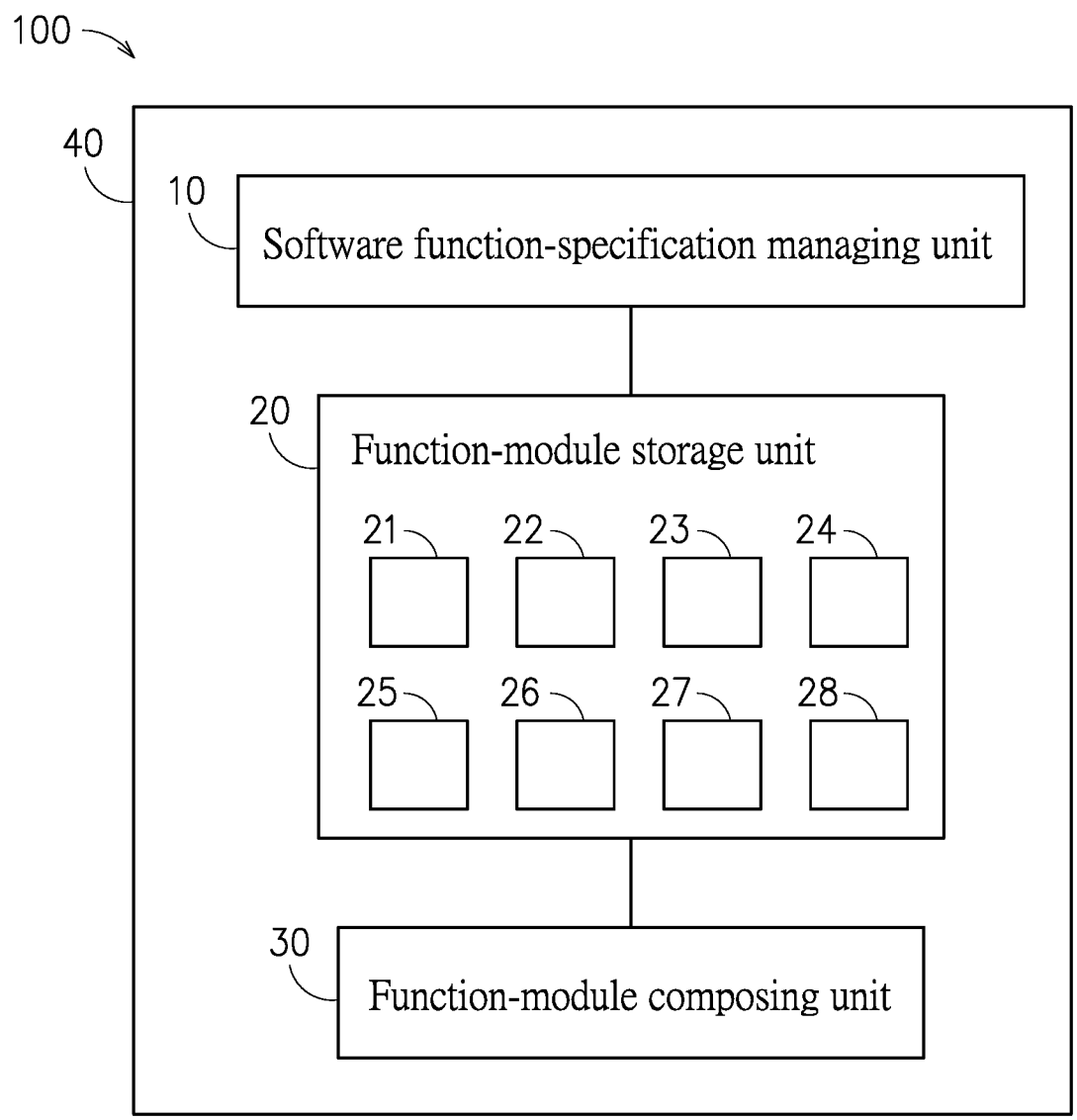
FIG. 1 is a schematic view of an embodiment of the device for dynamically generating numerical controller software of machine tool in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, a device for dynamically generating numerical controller software of machine tool 100 provided by this disclosure includes a software function-specification managing unit 10, a function-module storage unit 20 and a function-module composing unit 30.

The software function-specification managing unit 10 is used for utilizing or producing a text description file to describe function modules required by a numerical controller software of machine tool, and then performing specification analysis upon the text description file so as to generate a corresponding function module table including a plurality of function modules.

The function-module storage unit 20 is used for memorizing and managing a plurality of function modules with different functions 21~28. Then, the function-module storage unit 20 is applied to confirm whether or not the function module table has included all the function modules required by the numerical controller software of machine tool.

The function-module composing unit 30 is used for retrieving the required function modules 21~28 from the function-module storage unit 20, setting the connection among the function modules 21~28 so as to compose the numerical controller software of machine tool.

The software function-specification managing unit 10, the function-module storage unit 20 and the function-module composing unit 30 are communicatively connected via a network communication protocol.

In addition, a software/hardware mechanism 40 can be included to carry the software function-specification managing unit 10, the function-module storage unit 20 and the function-module composing unit 30.

It shall be explained that the eight function modules 21~28 shown in FIG. 1 are only taken as a typical example for an explanation purpose, not for limitation thereto. In the function-module storage unit 20 of this disclosure, the eight function modules 21~28 might have various functions to meet different types of machine tool such as milling machines, lathes and grinding machines. By composing different by required function modules 21~28 together, the required numerical controller software of machine tool can be formed.

Figure 2:
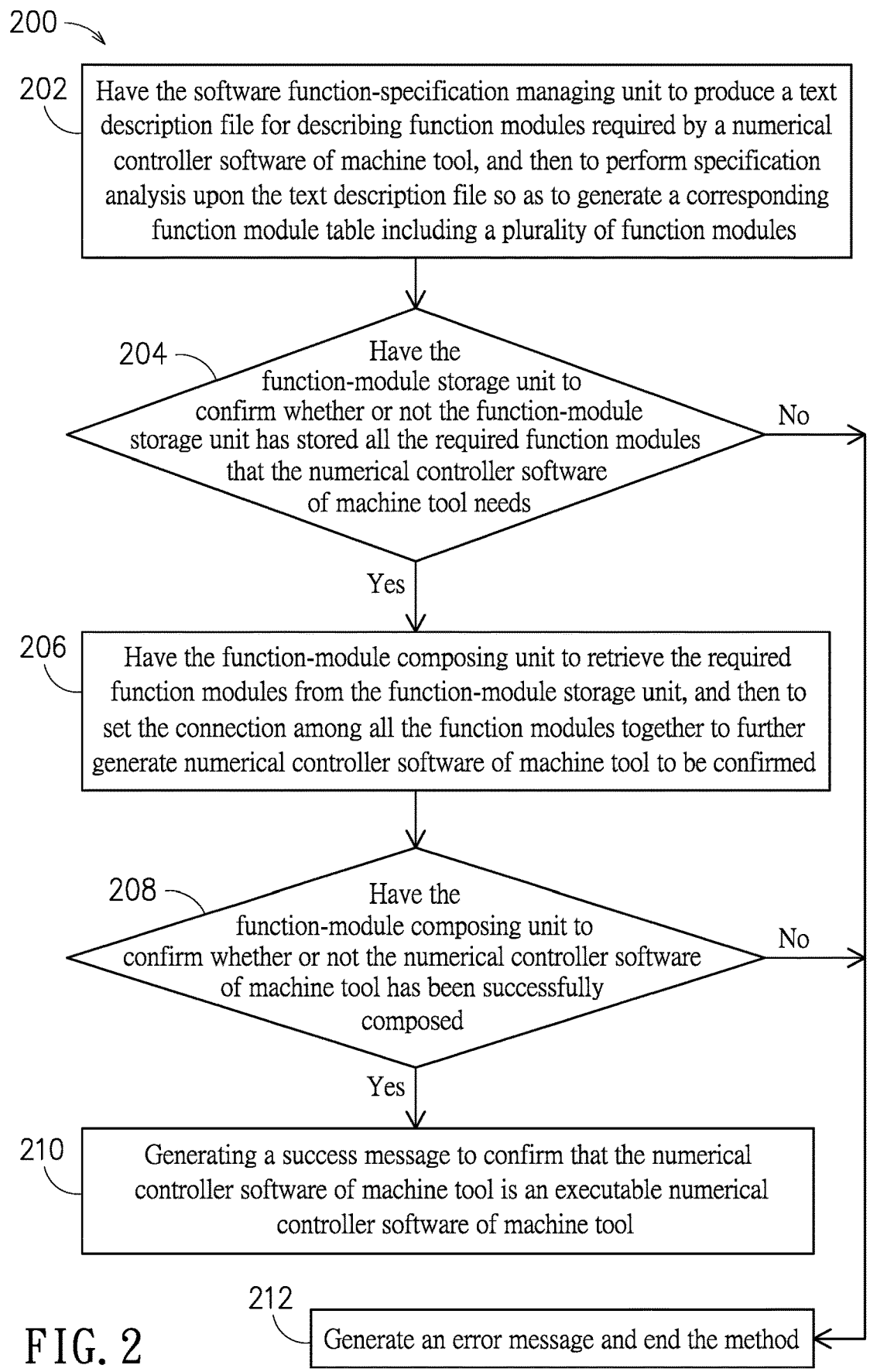
FIG. 2 is a flowchart of an embodiment of the method for dynamically generating numerical controller software of machine tool in accordance this disclosure.

Referring to FIG. 1 and FIG. 2, by implementing the device for dynamically generating numerical controller software of machine tool 100 of FIG. 1, the method for dynamically generating numerical controller software of machine tool 200 of FIG. 2 includes the following steps.

Step 202: Have the software function-specification managing unit 10 to produce a text description file for describing function modules required by a numerical controller software of machine tool, and then to perform specification analysis upon the text description file so as to generate a corresponding function module table including a plurality of function modules 21~28.

Step 204: Have the function-module storage unit 20 to confirm whether or not the function-module storage unit 20 has stored all the required function modules 21~28 that the numerical controller software of machine tool needs. If positive, then go to the next step. If negative, then generate an error message, and end the method (Step 212).

Step 206: Have the function-module composing unit 30 to capture the required function modules 21~28 from the function-module storage unit 20, and then to link, by setting, all the function modules 21~28 together to further generate numerical controller software of machine tool to be confirmed; and Step 208: Have the function-module composing unit 30 to confirm whether or not the numerical controller software of machine tool has been successfully composed. If positive, then generate a success message to confirm that the numerical controller software of machine tool is an executable numerical controller software of machine tool (Step 210). If negative, then generate an error message, and end the method (Step 212).

In Step 202, the text description file for describing the function modules required by the numerical controller software of machine tool is not limited to any specific format of the text description file. According to this disclosure, any text description file whose program language can be analyzed is qualified to be the text description file of this disclosure, such as the text description files, for example, in JSON (JavaScript™ Object Notation) format as shown in FIG. 3A and FIG. 3B.

Referring now to FIG. 3A, a text file for describing specifications of the controller software of three-axis milling center is shown, in which:

("hmi": "milling") stands for a human-machine interface module for this milling center (HMI);

("op": "milling") stands for an operation module for the milling center (OP);

("plc": "cnc_normal") stands for a programmable logic module for the milling center (PLC);

("mot": "milling") stands for a motion control module for the milling center (MOT);

("kinematics": "milling_3axis") stands for a three-axis kinematics calculation module for the milling center (AXIS 3); and, ("param": "cnc_full") stands for a configuration-file and parameters for the milling center (PARAM).

Referring now to FIG. 3B, a text file for describing specifications of the controller software of five-axis milling center is shown, in which:

("hmi": "milling") stands for a human-machine interface module for this milling center (HMI);

("op": "milling") stands for an operation module for the milling center (OP);

("plc": "cnc_normal") stands for a programmable logic module for the milling center (PLC);

("mot": "milling") stands for a motion control module for the milling center (MOT);

("kinematics": "milling_5axis") stands for a five-axis kinematics calculation module for the milling center (AXIS 5); and, ("param": "cnc_full") stands for a configuration-file and parameters for the milling center (PARAM).

The aforesaid HMI, OP, PLC, MOT, AXIS 3, PARAM are all abbreviations configured by the user for representing different function modules. It shall be understood that the aforesaid abbreviations are not unique, but only a more popular set out of many that can be used for abbreviations.

By comparing FIG. 3A to FIG. 3B, the only difference is at the three-axis kinematics calculation module for milling center and the five-axis kinematics calculation module for milling center. Namely, if the function modules 21~25 of FIG. 1 stand for HMI, OP, PLC, MOT, PARAM, respectively, then the function module 26 can stand for AXIS 3, the function module 27 can stand for AXIS 5, and the function module 28 can stand for the other required module.

In the embodiments of FIG. 3A and FIG. 3B, by providing only seven function modules to the function-module storage unit 20, the controller software for the three-axis or five-axis milling center would be satisfied, among which five of the seven function modules are common. Thus, the storage size for the function-module storage unit 20 can be significantly reduced. In other words, if the function-module storage unit 20 has been furnished with function modules applicable to versatile machine tools, then only the function modules that are not provided need to be deployed.

By having FIG. 3A as an example, after the text description file is analyzed by the software function-specification managing unit 10, the function module table 11 as shown in FIG. 4 can be generated, in which the listed terms include 6 function modules of (HMI_MODULE_CNC_MILLING), (OP_MODULE_CNC_MILLING), (PLC_MODULE_CNC_NOMAL), (MOT_MODULE_MILLING), (KINEMATICS_MODULE_MILLIN_3) and (PARA_MODULE_CNC_FULL).

Then, in Step 204, the function-module storage unit 20 would confirm if the function-module storage unit 20 has been furnished with all the function modules required for the numerical controller software of the three-axis milling center as listed in the function module table 11. If positive, then go to Step 206. If negative, then generate an error message, and end the method (Step 212).

Figure 5:
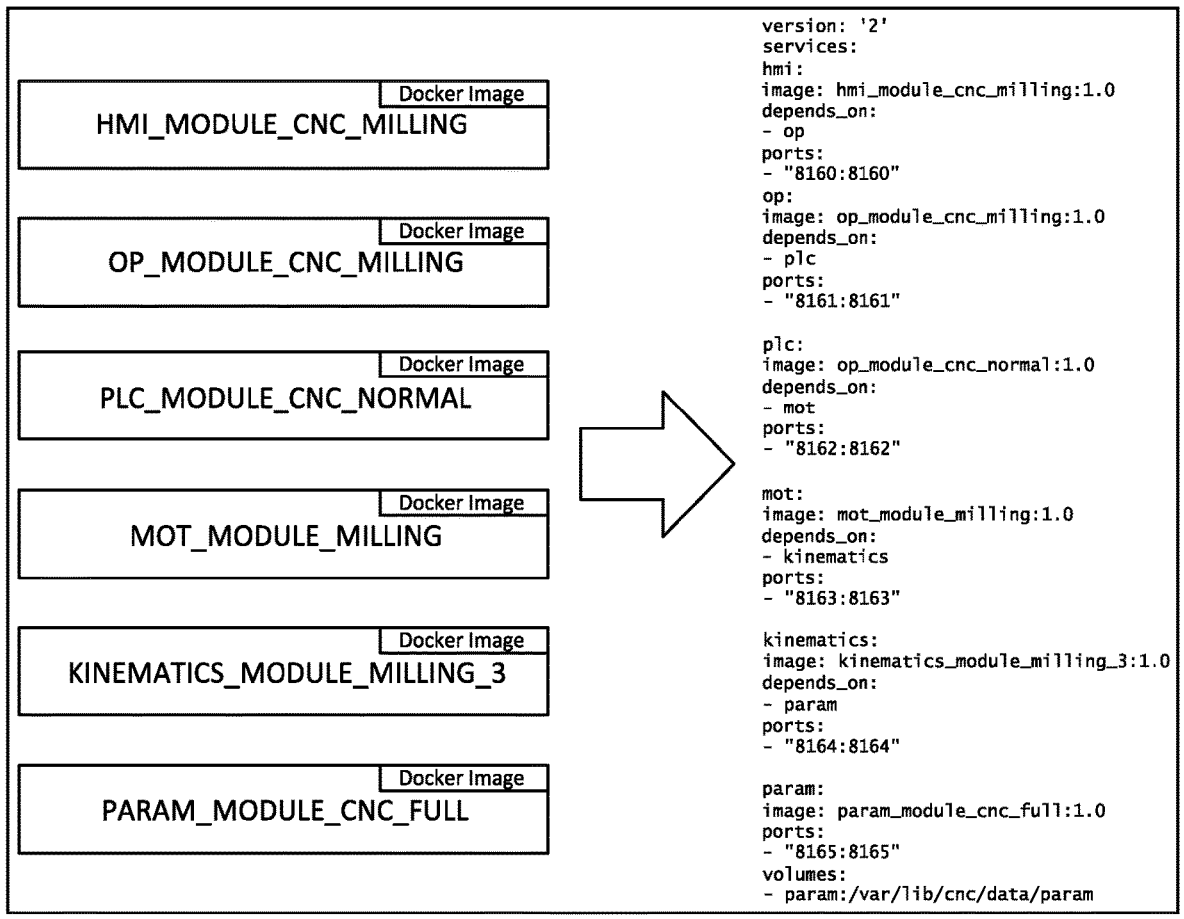
FIG. 5 demonstrates schematically a composition of the function modules in accordance with this disclosure.

Referring to FIG. 5, in Step 206, the function-module composing unit 30 would capture the six function modules listed in the function module table 11 (i.e., (HMI_MODULE_CNC_MILLING), (OP_MODULE_CNC_MILLING), (PLC_MODULE_CNC_NOMAL), (MOT_MODULE_MILLING), (KINEMATICS_MODULE_MILLIN_3) and (PARA_MODULE_CNC_FULL)) from the function-module storage unit 20, and then these 6 function modules are composed to form a numerical controller software of machine tool to be confirmed.

In this disclosure, the composition method, but not limited thereto, can produce a Docker Compose file, as shown at the right-hand side of FIG. 5, and then a "docker-compose up" command would activate all the function modules and services of the controller.

After the numerical controller software of machine tool to be confirmed of FIG. 5 is composed, then Step 208 can be performed for confirmation. As described above, the "docker-compose up" command can be used to activate all function modules and service of the controller. If the three-axis milling center can operate normally, it implies that the composed numerical controller software of machine tool is correct, and thus Step 210 would be performed. On the other hand, if the three-axis milling center cannot operate normally, it implies that the composed numerical controller software of machine tool is yet to be improved, and then Step 212 would be performed. However, possible reasons for not running the aforesaid process well should be judged by the related engineers, and who will render certain modification if necessary.

In summary, in the device for dynamically generating numerical controller software of machine tool and a method for the same provided by this disclosure, each individual function module can be deemed as an independent system, high-speed communication can be performed according to the network communication protocol, and a building-block concept can be used to compose or replace flexibly the required function modules, such that versatile numerical controller software of machine tool can be generated rapidly and dynamically.

By providing the device for dynamically generating numerical controller software of machine tool and the method for the same in accordance with this disclosure, the control core and important parameters can be clouded, relocating a factory in the future would need only the basic construction and remounting of machinery equipment and control systems, and then the numerical controller software of machine tool and process parameters can be rapidly built up through networking.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A device for dynamically generating numerical controller software for operation of a machine tool, comprising:
a software function-specification managing unit producing a text description file that describes a plurality of function modules required by the numerical controller software of the machine tool, and
performing specification analysis upon the text description file to generate a function module table including the plurality of function modules;
a function-module storage unit managing the plurality of function modules with various functions, wherein the function-module storage unit is used to determine whether the function-module storage unit is furnished with the plurality of function modules required by the numerical controller software of machine tool; and
a function-module composing unit retrieving the plurality of function modules from the function-module storage unit and establishing a connection among the plurality of function modules to form the numerical controller software of the machine tool in accordance with the connection between the plurality of function modules, confirming the numerical controller software of the machine tool has been successfully composed, and generating a success message upon confirming the numerical controller software of the machine tool is executable;
wherein the function module table is generated in accordance with all of the plurality of function modules specifically required for the machine tool to operate under control of the numerical controller software.

2. The device for dynamically generating numerical controller software of machine tool of claim 1, wherein the software function-specification managing unit, the function module storage unit and the function-module composing unit are communicatively connected via a network communication protocol.

3. The device for dynamically generating numerical controller software of machine tool of claim 1, further including a software/hardware mechanism for carrying the software function-specification managing unit, the function-module storage unit and the function-module composing unit.

4. A method for dynamically generating numerical controller software for operation of a machine tool, comprising the steps of:
  (a) having a software function-specification managing unit produce a text description file describing a plurality of function modules required by a numerical controller software of the machine tool, and
    performing specification analysis upon the text description file to generate a function module table including the plurality of function modules,
    wherein the function module table is generated in accordance with all of the plurality of function modules specifically required for the machine tool to operate under control of the numerical controller software;
  (b) having a function-module storage unit determine whether the function-module storage unit is furnished with the plurality of function modules required by the numerical controller software of the machine tool, and if not, generating an error message and ending the method;
  (c) having a function-module composing unit retrieve the plurality of function modules from the function-module storage unit, establish a connection among the plurality of function modules, and
    generating the numerical controller software of machine tool in accordance with the connection among the plurality of function modules; and
  (d) having the function-module composing unit determine whether the numerical controller software of the machine tool has been assembled with the plurality of function modules specified by the function module table, and
    generating a success message to confirm that the numerical controller software of machine tool is an executable numerical controller software of the machine tool and
    storing the executable numerical controller software and parameters in a cloud, else generating an error message and ending the method.

5. The method for dynamically generating numerical controller software of machine tool of claim 4, wherein the text description file is in a JSON (JavaScript Object Notation) format.

6. The method for dynamically generating numerical controller software of machine tool of claim 4, wherein the function-module composing unit utilizes Docker Compose to compose the plurality of function modules into a Docker Compose file.

* * * * *